(12) United States Patent
Bhow

(10) Patent No.: US 8,693,660 B2
(45) Date of Patent: Apr. 8, 2014

(54) AUTO-DIAL AND CONNECTION INTO CONFERENCE CALLS

(75) Inventor: Gunjan Dhanesh Bhow, Menlo Park, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1364 days.

(21) Appl. No.: 12/252,843

(22) Filed: Oct. 16, 2008

(65) Prior Publication Data

US 2010/0098230 A1    Apr. 22, 2010

(51) Int. Cl.
*H04M 3/42* (2006.01)

(52) U.S. Cl.
USPC ...................................... 379/202.01; 379/158

(58) Field of Classification Search
USPC ........................ 379/202.01, 265.01–265.14, 379/266.01–266.1, 309, 201.01, 158
See application file for complete search history.

(56) References Cited

U.S. PATENT DOCUMENTS

| | | | |
|---|---|---|---|
| 5,872,841 A * | 2/1999 | King et al. | 379/210.01 |
| 5,953,400 A | 9/1999 | Rosenthal | |
| 6,154,645 A | 11/2000 | Ahlstrom et al. | |
| 6,275,575 B1 | 8/2001 | Wu | |
| 6,354,748 B1 | 3/2002 | Vrvilo | |
| 6,405,051 B1 | 6/2002 | Ahlström et al. | |
| 6,434,139 B1 | 8/2002 | Liu | |
| 6,731,732 B2 | 5/2004 | Creamer | |
| 6,735,294 B2 | 5/2004 | Creamer | |
| 6,798,753 B1 * | 9/2004 | Doganata et al. | 370/260 |
| 6,876,734 B1 * | 4/2005 | Summers et al. | 379/202.01 |
| 7,092,671 B2 | 8/2006 | Lunsford | |
| 7,133,512 B2 | 11/2006 | Creamer et al. | |
| 7,251,320 B1 | 7/2007 | Todd | |
| 7,277,697 B2 | 10/2007 | Desai | |
| 7,310,320 B2 | 12/2007 | Decker | |
| 7,317,919 B1 | 1/2008 | Ruf | |
| 7,343,008 B1 | 3/2008 | Frankel | |
| 7,421,401 B2 * | 9/2008 | Demsky et al. | 705/7.19 |
| 7,602,893 B2 * | 10/2009 | Bhatia et al. | 379/202.01 |
| 8,009,874 B2 * | 8/2011 | Brown | 382/115 |
| 8,121,547 B2 | 2/2012 | Findlay et al. | |
| 8,346,231 B1 * | 1/2013 | Smith et al. | 455/416 |
| 2004/0125933 A1 | 7/2004 | Jun | |

(Continued)

FOREIGN PATENT DOCUMENTS

| | | |
|---|---|---|
| WO | 2005104512 A1 | 11/2005 |
| WO | 2008009090 A1 | 1/2008 |
| WO | WO 2010/045070 A1 | 4/2010 |

OTHER PUBLICATIONS

IBM. Join Conference—A Method of Joining a Teleconference with One Click. Jan. 17, 2008. UTC. IP.COM ID: IPCOM000166586D. United States.

(Continued)

*Primary Examiner* — William Deane, Jr.
(74) *Attorney, Agent, or Firm* — Chuang Intellectual Property Law

(57) ABSTRACT

Methods and systems for dialing into conference calls are presented. A meeting request is received by an attendee, and the dial-in information in the meeting request is stored. A meeting reminder is displayed at the proposed date and time or a predetermined period prior to the proposed date and time, and a conference call confirmation instruction or cancellation instruction is received from the attendee. The conference call dial-in number is automatically dialed at the proposed date and time. A network connection is established and the conference call meeting identification number is transmitted.

37 Claims, 16 Drawing Sheets

(56) References Cited

U.S. PATENT DOCUMENTS

| | | | |
|---|---|---|---|
| 2004/0208303 A1 | 10/2004 | Rajagopalan | |
| 2005/0018827 A1 | 1/2005 | Himmel et al. | |
| 2005/0044503 A1* | 2/2005 | Richardson et al. | 715/753 |
| 2005/0053214 A1 | 3/2005 | Reding | |
| 2005/0152523 A1 | 7/2005 | Fellenstein | |
| 2006/0107221 A1* | 5/2006 | Haug | 715/752 |
| 2006/0177034 A1 | 8/2006 | Reding et al. | |
| 2006/0179114 A1 | 8/2006 | Deeds | |
| 2006/0246874 A1 | 11/2006 | Sullivan | |
| 2007/0004463 A1* | 1/2007 | Clark et al. | 455/569.1 |
| 2007/0016362 A1 | 1/2007 | Nelson | |
| 2007/0064898 A1 | 3/2007 | Amano | |
| 2007/0093235 A1 | 4/2007 | Kimbrell | |
| 2007/0121829 A1* | 5/2007 | Tal et al. | 379/93.09 |
| 2007/0172044 A1 | 7/2007 | Nguyen | |
| 2007/0172045 A1 | 7/2007 | Nguyen | |
| 2007/0263603 A1* | 11/2007 | Schmitt | 370/356 |
| 2007/0271527 A1 | 11/2007 | Paas | |
| 2007/0280459 A1 | 12/2007 | Yee et al. | |
| 2008/0037748 A1 | 2/2008 | Jefferson | |
| 2008/0109517 A1* | 5/2008 | Sarkar et al. | 709/206 |
| 2008/0130936 A1* | 6/2008 | Lau et al. | 381/370 |
| 2008/0186164 A1* | 8/2008 | Emigh et al. | 340/539.13 |
| 2008/0279118 A1* | 11/2008 | Hyun et al. | 370/260 |
| 2009/0018887 A1 | 1/2009 | Bank et al. | |
| 2009/0190736 A1* | 7/2009 | Bertin et al. | 379/202.01 |
| 2010/0054518 A1* | 3/2010 | Goldin | 381/370 |
| 2010/0098230 A1 | 4/2010 | Bhow | |
| 2010/0189238 A1 | 7/2010 | Gupta | |
| 2011/0306366 A1 | 12/2011 | Trussel et al. | |
| 2012/0166568 A1* | 6/2012 | Helbling et al. | 709/206 |

OTHER PUBLICATIONS

IBM. Method for Never Miss a Teleconference Call or Meeting Again (abbreviated version). Jan. 19, 2006. UTC. IP.COM ID: IPCOM000133267D. United States.

Anonymous. Wireless Calendar Meeting Automation and Audit with Wireless Presence Detection (abbreviated version). Nov. 21, 2005. UTC. IP.com ID: IPCOM000131895D. Canada.

European Patent Office. International Search Report: PCT/US2009/059642. Mail Date: Feb. 10, 2010. Rijswijk, Netherlands.

European Patent Office. Written Opinion: PCT/US2009/059642. Mail Date: Feb. 10, 2010. Rijswijk, Netherlands.

\* cited by examiner

AUTO-DIAL AND CONNECTION INTO CONFERENCE CALLS

BACKGROUND OF THE INVENTION

As the modern workforce becomes increasingly mobile and distributed geographically, many meetings are held using a telephone conference call, with some or all attendees calling (also referred to herein as "dialing in") into the conference call. Typically, potential attendees of the telephone conference call are sent a meeting request by the meeting organizer or participant via an office email/calendaring application such as Microsoft Outlook. The meeting request notification message is often in the form of a specialized meeting request email which provides the recipient with various response options, including whether to accept or reject the meeting request. The meeting request notification may also be in the form of electronic messages, such as SMS messages. The meeting request may also be a standard email offering the recipient no response options. The meeting request is usually very tightly integrated with the scheduling/calendaring system in addition to the email system. Indeed, in one example the email itself may not be generated by a human user, but from the calendaring/scheduling software system as a result of a meeting being scheduled. Information related to the meeting, such as time and place is included in various data fields of the meeting request. For example, meeting information may be found in a "Subject" data field, "Notes" data field, "Description" data field, or other similar data field. The particular nomenclature, type, and number of data fields in the meeting request varies based on the particular email/calendaring application used.

The meeting request may or may not pertain to a telephone conference call. Where the meeting request is a request to participate in a telephone conference call, the meeting request typically includes a dial-in telephone number used to call into the telephone conference. The meeting request also typically includes a conference identification number that the attendee enters once the call to the dial-in number is connected. The conference identification number enables the conference call system to locate the desired conference call to join the attendee calling in. The meeting request may include a user identification number specific to the meeting request recipient that the attendee may enter once the call is connected. For example, the user identification number may identify the attendee as the conference call leader or other designation. Though the meeting organizer will typically place the dial-in telephone number and conference identification number in the "Description" or "Notes" data field, it may also be placed in other data fields. Information necessary to connect to the conference call is often referred to as "dial-in information."

In the prior art, to participate in the telephone conference call, at the time of the meeting the attendee must locate the dial-in number, conference identification number, and possibly user identification number. Typically, the attendee opens the calendar item or email corresponding to the meeting on the electronic calendar on his personal computer or mobile phone, looks up the number for dialing in and then dials it manually. The attendee may need to manually write the number down on paper to assist him in making the call. Once the call is connected, the attendee must then enter the conference identification number and user identification number.

This process is cumbersome and has several limitations. The attendee must manually look up, remember, and key in the dial-in number. Once connected, the attendee must manually enter the conference identification number (also referred to herein as the "meeting identification number" or "conference call identification number") and possibly the user identification number if applicable. If the attendee makes a mistake in keying in any of these numerical strings, an error occurs and the attendee must begin again.

Where the meeting information is stored on the attendee's personal computer, if the personal computer is off, significant time is required to access the dial-in number as the personal computer must be booted up. Where the meeting information is stored on the attendee's mobile phone or smartphone, it may not be safe or practical to look up the small digits in the mobile phone or smartphone and note them down before initiating the call. This is particularly true if the attendee is traveling in an automobile or busy with other activities.

As a result, there is a need for improved methods and systems for connecting telephone conference call attendees.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
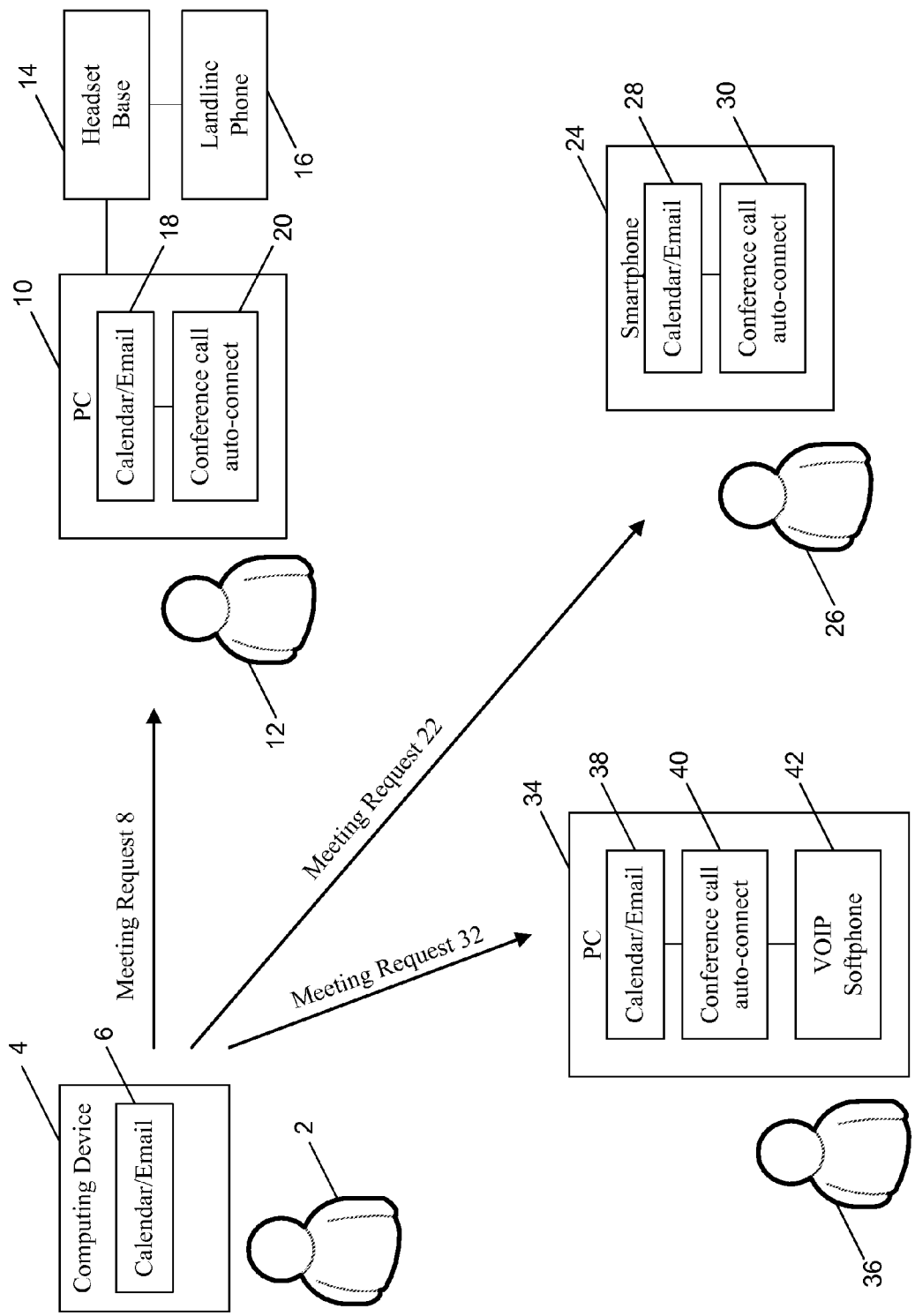
FIG. 1 illustrates receiving a meeting request at several types of user computing devices.

Methods and apparatuses for auto-dialing and connection into conference calls are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The methods and systems described herein deliver significant ease-of-use to the end-user. Valuable time is saved to an organization due to less time spent by meeting attendees dialing into telephone conference meetings. In one example, a meeting organizer sets up a telephone conference meeting using an office calendaring/email program such as Microsoft Outlook to send invitations out to attendees. As part of this meeting invitation, the "Dial-in information" is included. If the recipient "Accepts" the meeting invitation, on the recipient's computer and/or his mobile smartphone (e.g., a mobile phone running an office calendaring/email program, such as a Blackberry device or Apple iPhone), a resident software program (e.g. a plug-in to Outlook) scans the calendar item, and extracts the phone number as well as the meeting identification (ID) number. If the meeting ID is followed by a leader or a participant code (also referred to herein as a "user identification number"), the software program also extracts that.

In one example, the resident software program is executed on a PC coupled to a headset base via a USB cable. This headset base in turn is coupled to a landline PSTN phone. In this configuration, the resident software program is capable of controlling the landline PSTN phone to initiate outgoing calls on the PSTN. In one example, the resident software program activates if it detects a headset is connected to the PC. In a further example, the software program on the PC and the smartphone is always active.

A predetermined amount of time prior to the call, such as 1-10 minutes before the scheduled call, the software program running on the user's smartphone or PC prompts the user of the upcoming meeting, and shows three options: dial-in as attendee (the default selection), dial-in as leader, and cancel. If the user chooses to dial-in, the following occurs: (1) If the user is on a PC connected to a deskphone via a headset base, the software program instructs the headset base via a USB link to dial using the deskphone, (2) If the user is on a PC not connected to a deskphone, the software application dials into the meeting using a softphone application (e.g. Avaya or Skype), or (3) If the user is on a smartphone, the software applications dials in using the mobile phone. After dialing into a meeting, the software application automatically enters the meeting ID number and the leader or participant code as necessary. Furthermore, the software application may use a pre-stored voice signature to announce the user into the meeting.

In one example, the software application sends the dial-in information to a web based server. The server initiates the conference call from the web cloud to the PSTN infrastructure, and then makes another call to the user (e.g., at the user's deskphone, mobile phone, or softphone) to "patch them in". This has an advantage of much more simplicity, robustness, and ubiquity due to independence from the particular kind of deskphone or mobile phone used by the user.

In one example, a method for dialing into a conference call includes receiving at an attendee computing device a meeting request notification message comprising a meeting request, where the meeting request includes a proposed date and time. The meeting request notification message is opened and the meeting request is displayed on the attendee computing device. An accept meeting instruction or a reject meeting instruction is then received from the attendee. The method further includes scanning a contents of the meeting request notification message to identify a conference call dial-in number and a conference call meeting identification number responsive to receiving the accept meeting instruction. The conference call dial-in number and the conference call meeting identification number are stored in a memory at the computing device, and the meeting request is placed on a calendaring application at the attendee computing device at the proposed date and time.

A meeting reminder is displayed on the attendee computing device at the proposed date and time or a predetermined period prior to the proposed date and time, and a conference call confirmation instruction or cancellation instruction is received from the attendee. The method further includes automatically calling the conference call dial-in number at the proposed date and time responsive to receiving the conference call confirmation instruction. A network connection is established with a remote device, and the conference call meeting identification number is transmitted over the network connection to the remote device.

In one example, a system for dialing into a conference call includes a landline telephone connected to the public switched telephone network, a headset base coupled to the landline telephone, and a computing device such as a personal computer or notebook computer coupled to both the headset base and a communications network. The computing device includes a meeting request notification message means for receiving a meeting request notification message comprising a meeting request over the communications network, where the meeting request includes a proposed date and time. For example, the meeting request notification message means may be a standard integrated email/calendaring software application, such as Microsoft Outlook, or Google Mail. The computing device also includes a scanning means for scanning a contents of the meeting request notification message to identify a conference call dial-in number and a conference call meeting identification number. In one example, the scanning means is a text recognition software application programmed to identify telephone numbers and identification numbers.

The computing device further includes a calendaring means, such as a software application similar to Microsoft Outlook or Google Calendar, for placing the meeting request on a calendaring application at the computing device at the proposed date and time. For example, this calendaring means may be integrated with the meeting request notification message means previously discussed. The computing device includes a dialing means for automatically calling the conference call dial-in number at the proposed date and time though the public switched telephone network, and automatically transmitting the conference call meeting identification number over an established public switched telephone network connection. In one example, the dialing means is a software application integrated with the scanning means to form a conference call auto-connect software application.

In one example, a computer readable storage medium storing instructions that when executed by a computer cause the computer to perform a method for dialing into a conference call. The method performed by the stored instructions includes receiving at an attendee computing device a meeting request notification message comprising a meeting request, where the meeting request includes a proposed date and time. The meeting request notification message is opened and the meeting request is displayed on the attendee computing device. An accept meeting instruction or a reject meeting instruction is then received from the attendee. The method further includes scanning a contents of the meeting request notification message to identify a conference call dial-in number and a conference call meeting identification number responsive to receiving the accept meeting instruction. The conference call dial-in number and the conference call meeting identification number are stored in a memory at the computing device, and the meeting request is placed on a calendaring application at the attendee computing device at the proposed date and time.

A meeting reminder is displayed on the attendee computing device at the proposed date and time or a predetermined period prior to the proposed date and time, and a conference call confirmation instruction or cancellation instruction is received from the attendee. The method further includes automatically calling the conference call dial-in number at the proposed date and time responsive to receiving the conference call confirmation instruction. A network connection is established with a remote device, and the conference call meeting identification number is transmitted over the network connection to the remote device.

In one example, a method for dialing into a conference call includes receiving at an attendee computing device a meeting request notification message comprising a meeting request, where the meeting request includes a proposed date and time. The meeting request notification message is opened and the meeting request displayed on the attendee computing device. The method includes receiving an accept meeting instruction or a reject meeting instruction from the attendee. The contents of the meeting request notification message are scanned to identify a conference call dial-in number and a conference call meeting identification number responsive to receiving the accept meeting instruction. The method includes transmitting the conference call dial-in number and the conference call meeting identification number to a first remote device for storage in a memory of the first remote device. An attendee call-back number input at the attendee computing device by the attendee is received, and the attendee call-back number is transmitted to the first remote device for storage in the memory of the first remote device. The meeting request is placed on a calendaring application at the attendee computing device at the proposed date and time.

The method further includes displaying a meeting reminder on the attendee computing device at the proposed date and time or a predetermined period prior to the proposed date and time. A conference call confirmation instruction or cancellation instruction is received from the attendee. The method includes automatically calling the conference call dial-in number using the first remote device at the proposed date and time responsive to receiving a conference call confirmation instruction. A network connection is established between the first remote device and a second remote device, and the conference call meeting identification number is transmitted from the first remote device to the second remote device over the network connection. The method includes automatically calling the call-back number using the first remote device, and establishing a second network connection between the first remote device and an attendee telephone. The attendee telephone is linked to the second remote device to join a conference call.

FIG. 1 illustrates receiving a meeting request at several types of attendee computing devices, whereby the meeting request is processed to enable auto-dial in and connection into conference calls. A meeting organizer 2 at a computing device 4 sends out one or more meeting request notification messages to desired attendees using a calendaring/email application 6. The specific calendaring/email application 6 may vary. The meeting request notification message may be a specialized form utilized for meeting requests, or may simply be a standard email where the meeting organizer includes dial-in information somewhere in the email text. The meeting request notification message may be an email, SMS message, or other type of electronic message.

Where the meeting request is a specialized form, the recipient of the meeting request typically has the option of accepting or rejecting the meeting request, and the meeting request is placed on the recipient calendar if accepted using time and date information contained in the meeting request. In one example, the calendaring/email application 6 is a commercially available program such as Microsoft Outlook, Google Calendar, or comparable program. In one example, the meeting request is sent in the form of an email to the desired attendees, either from the email program or the calendar program. Computing device 4 may be any type of computing device capable of running the calendaring/email application 6 including, for example, a notebook computer, personal computer, PDA, or smartphone.

Referring again to FIG. 1, the meeting request may be received by an attendee using a variety of types of computing devices. Generally, the computing devices may be any device capable of executing the applications described herein. In one example, a meeting request 8 sent by meeting organizer 2 is received by an attendee 12 at a personal computer 10, such as a desktop or notebook computer. The personal computer 10 executes a calendar/email application 18 operable to receive and open the meeting request 8. Personal computer 10 also executes a conference call auto-connect application 20 operable to perform the functions and processes described herein. In one example, conference call auto-connect application 20 is a plug-in application to the calendar/email application 18. A headset base station 14 is coupled to personal computer 10, and the headset base station 14 is also coupled to a landline telephone 16 connected to a telephone network such as a public switched telephone network.

In a further example, a meeting request 22 sent by meeting organizer 2 is received by an attendee 26 at a smartphone 24. The smartphone 24 executes a calendar/email application 28 operable to receive and open the meeting request 22. The smartphone also executes a conference call auto-connect application 30 operable to perform the functions and processes described herein.

In a further example illustrated in FIG. 1, a meeting request 32 sent by meeting organizer 2 is received by an attendee 36 at a personal computer 34. The personal computer 34 executes a calendar/email application 38 operable to receive and open the meeting request 32. Personal computer 34 also executes a conference call auto-connect application 40 operable to perform the functions and processes described herein. In one example, conference call auto-connect application 40 is a plug-in application to the calendar/email application 38. In this example, the conference call auto-connect application 40 is also in communication with a VoIP softphone application 42.

In one example, the conference call auto-connect application includes a text scanning module for processing a contents of a meeting request to identify the presence and values of dial-in information such as the conference call dial-in number and a conference call meeting identification number within the meeting request. In one example, the text scanning module is a text recognition software application programmed to identify telephone numbers and identification numbers. The conference call auto-connect application also includes a dialing module for automatically calling the conference call dial-in number and automatically transmitting the conference call meeting identification number.

Figure 3:
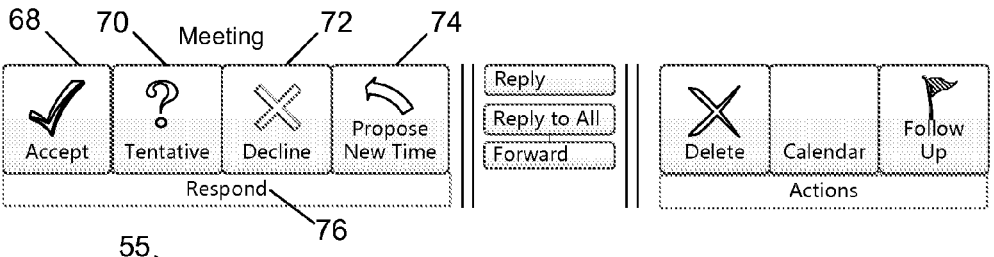
FIG. 3 illustrates a meeting request received at a user computing device.

FIG. 3 illustrates a meeting request 300 received at an attendee computing device which has been opened by the attendee and displayed on the attendee computing device. The meeting request 300 includes a set of "Respond" options 76 which the attendee may select in response to the meeting request. In the example shown in FIG. 3, the Respond options 76 include an Accept response 68, Tentative response 70, Decline response 72, and Propose New Time response 74. Meeting request 300 includes a From field 55 indicating the name of the meeting organizer who sent the request, as well as a Required field 56 indicating attendees the meeting request 300 was sent to viewed as being required for the meeting. The meeting request 300 also includes an Optional field 58 indicating any names the meeting request 300 was sent to who are viewed as being optional attendees of the meeting.

The meeting request 300 also includes a variety of text fields 67 containing text entered by the meeting organizer who composed the meeting request 300. For example, the text fields 67 may include a Subject text field 60, Location text field 62, When text field 64, and Description text field 66. The Description text field 66 or other similar multi-line text field typically contains the main body of the text written by the meeting organizer when composing the meeting request.

In the example shown in FIG. 3, the meeting request is a request to participate in a telephone conference call, as opposed to an "in-person" face-to-face meeting. The meeting organizer has included a conference call Dial-in number 69, conference identification number 71, and user ID number 73 in the Description text field 66. In further examples, one or more of the Dial-in number 69, conference identification number 71, and user ID number 73 may be placed in a text field 67 other than the Description text field 66, depending on how the meeting organizer chooses to compose the meeting request. For example, the Dial-in number 69 may appear in the Location text field 62 or Subject text field 60 rather than the Description text field 66. Furthermore, the Dial-in number 69, conference identification number 71, and user ID number 73, while contained in the meeting request, may not be specifically referred to by name or referred to using different or abbreviated names. For example, the meeting organizer may assume that simply by providing a telephone number somewhere in the meeting request, the attendee will recognize that this is the dial-in number for the conference call without the need for it to be so labeled.

Figure 4:
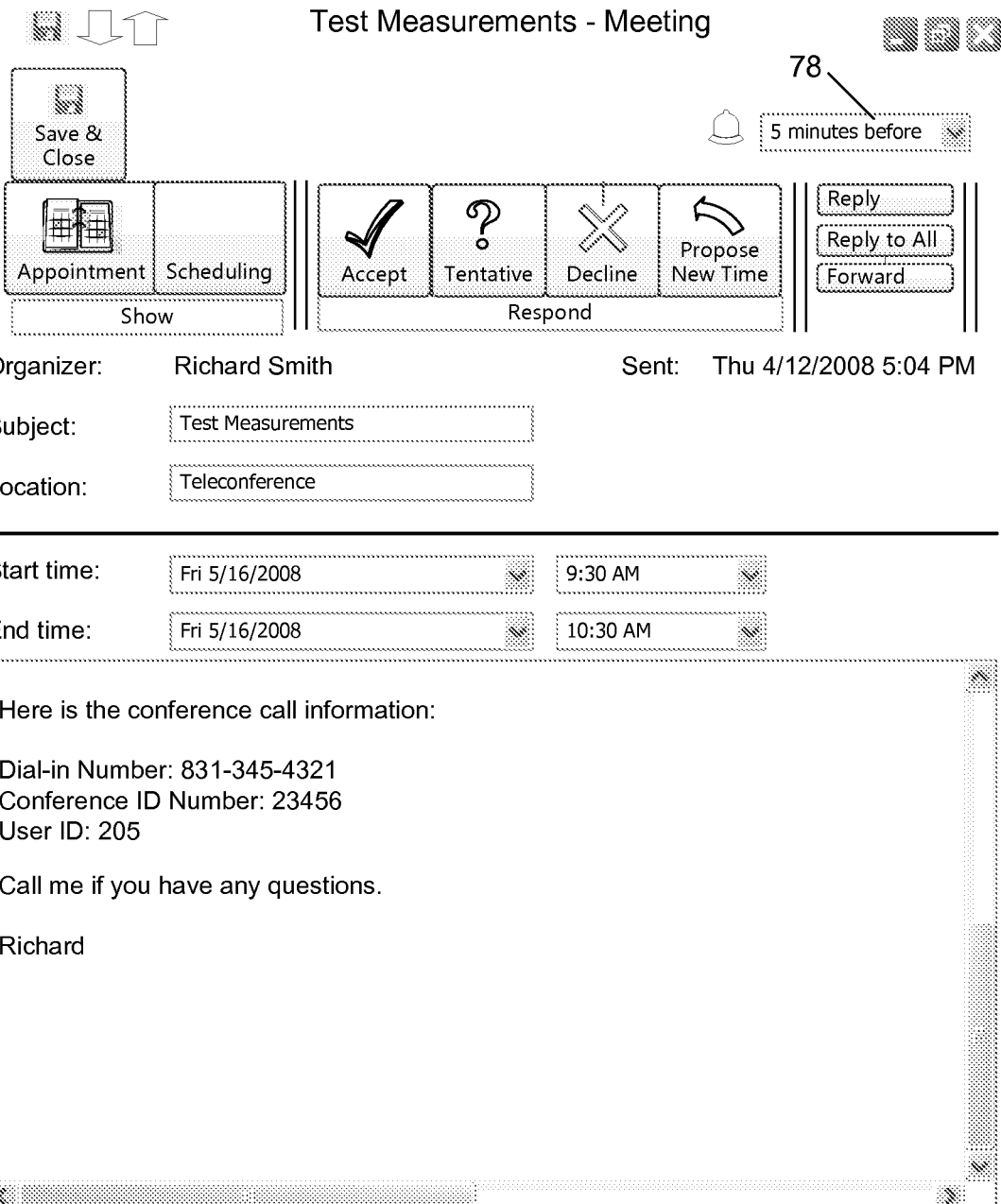
FIG. 4 illustrates a calendar item corresponding to the meeting request shown in FIG. 3, where the meeting request has been accepted by a user.

After viewing the opened meeting request 300, the attendee may choose to accept the meeting request using the Accept response 68 command. Alternatively, the attendee may also choose one of the other Respond options 76. If the attendee accepts the meeting request, a calendar event associated with the meeting is placed on the attendee calendar at the meeting date and time. FIG. 4 illustrates an opened calendar event 400 displayed at the attendee device corresponding to the meeting request shown in FIG. 3, where the meeting request has been accepted by an attendee.

Referring to FIG. 4, the opened calendar event 400 contains meeting information transferred from the meeting request 300 shown in FIG. 3. For example, the opened calendar event 400 may include information transferred from the Subject text field 60, Location text field 62, and Description text field 66. Referring to FIG. 4, the opened calendar event 400 includes a Reminder field 78 allowing the attendee to select a time prior to the meeting to be reminded. In the example shown, the attendee will be reminded 5 minutes before the scheduled start time. The contents of the reminder, as discussed below, are dependent on whether the meeting request has been identified as a telephone conference call meeting.

If the attendee accepts the meeting request, the conference call auto-connect application at the attendee device determines whether the meeting request is a request for a telephone conference call meeting. Referring again to FIG. 3, in one example, the text fields 67 containing information input by the organizer is scanned (i.e., processed) to identify whether a dial-in number and conference identification number are contained anywhere in the meeting request. As mentioned previously, since the meeting request may be used for meetings other than conference calls, there may not be data fields specific to dial-in information. Thus, the meeting organizer may put the dial-in information in any of several text fields. The text fields 67 may also be scanned to identify whether a user identification number is contained anywhere in the meeting request. For example, select keywords may be scanned for such as "dial-in", "meeting number", or "user id" and numerical strings following such keywords identified. Alternatively, numerical strings may be scanned for and identified as a telephone number if containing the appropriate number of digits or in a standardized telephone number format.

If a dial-in number is recognized, the meeting request is classified as a telephone conference meeting. If recognized, the dial-in number, conference identification number, and/or user identification number are stored in memory at the attendee device for later use by the conference call auto-connect application. Depending on the nature of the conference call, only the dial-in number, both the dial-in number and the conference identification number, or all three of the dial-in number, conference identification number, and user identification number may be present in the meeting request.

Figure 5:
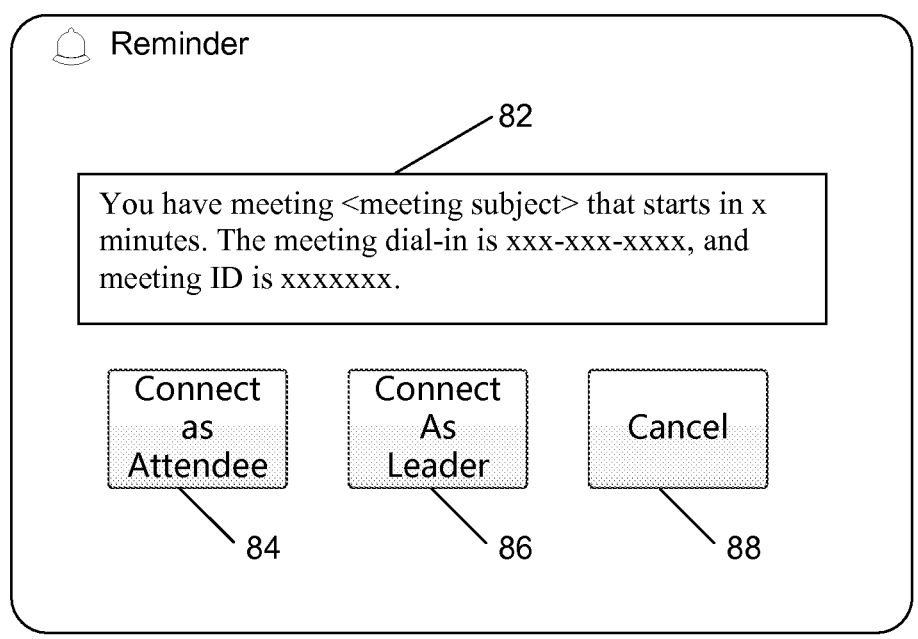
FIG. 5 illustrates a conference call reminder/instruction request prompt.

If the attendee has selected to be reminded of the calendar item, at the predetermined reminder time a reminder is displayed on the attendee computing device. Where the received meeting request has been previously identified as a telephone conference call meeting, the reminder consists of a conference call reminder/instruction request prompt. Where the received meeting request has not been previously identified as a telephone conference call, the displayed reminder is a standard meeting reminder as used by the calendaring application. FIG. 5 illustrates a conference call reminder/instruction request prompt 500 in one example. The conference call reminder/instruction request prompt 500 includes an information field 82 informing the attendee of the upcoming conference call, and may include the meeting subject and previously identified dial-in number and meeting identification number. If previously identified, the user identification number may also be displayed. The user identification number may be used to indicate whether the attendee is a designated conference call leader and whether the attendee has the option of connecting to the conference call as the conference call leader. The conference call reminder/instruction request prompt 500 presents several options that the attendee may select. The attendee may select to either connect to the conference call or cancel the conference call. In the example shown in FIG. 5, the attendee may choose to connect as an attendee 84, connect as the leader 86, or cancel 88 the conference call. Where the attendee does not have the option of connecting as a leader (e.g., the attendee has not been previously identified as a conference call leader), the conference call reminder/instruction request prompt 500 presents only a single connect option and a cancel option.

In one example, the meeting reminder is displayed on multiple attendee computing devices. For example, the meeting reminder is displayed on both the user desktop PC and the user smartphone where the devices have a synchronized calendar. In this example, the device at which the user selects to connect or cancel is the device at which the call to the dial-in number is initiated.

If the attendee chooses to connect to the telephone conference call, at the designated meeting date and time, the conference call auto-connect application automatically calls the dial-in-number. In a further example, the conference call reminder/instruction request prompt 500 is not utilized and the conference call auto-connect application automatically calls the dial-in-number at the designated meeting date and time if the attendee has previously accepted the meeting request.

Figure 2:
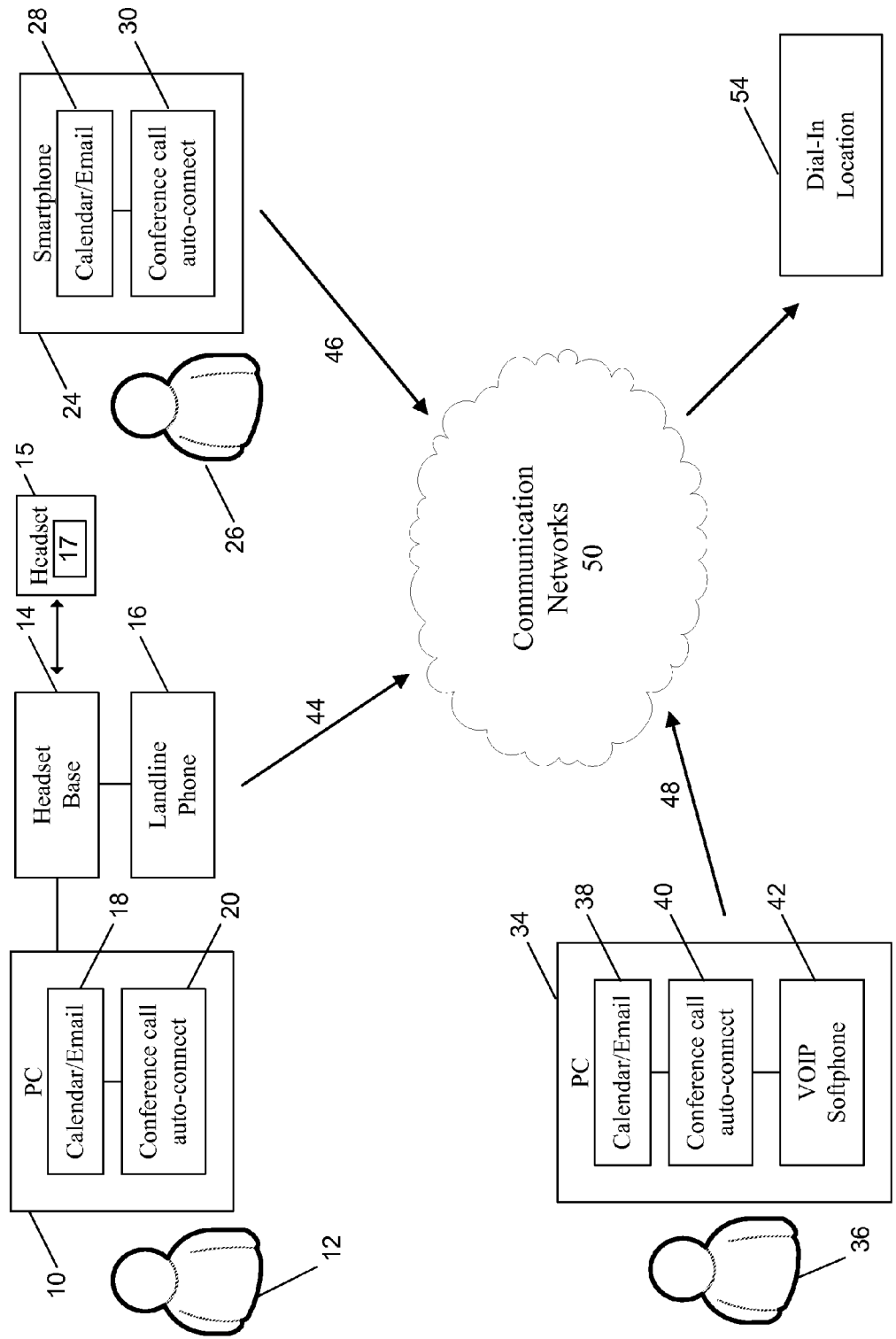
FIG. 2 illustrates auto-dialing into a dial-in location using several types of user computing devices.

FIG. 2 illustrates auto-dialing into a dial-in location 54 using several types of attendee computing devices at the scheduled meeting date and time. In FIG. 2, attendees 12, 26, and 36 have accepted meeting requests 8, 22, and 32 respectively, sent by meeting organizer 2 shown in FIG. 1.

Referring to FIG. 2, at attendee 12 conference call auto-connect application 20 retrieves the previously stored dial-in number from memory at personal computer 10 and initiates a call 44 to dial-in location 54 via communication networks 50. In one example, call 44 is a landline call placed over a public switched telephone network.

In one example, the conference call auto-connect application 20 launches only when it is capable of initiating dialing through landline telephone 16. For example, conference call auto-connect application 20 may launch only when a headset 15 associated with the headset base 14 is active and/or donned (worn) by the attendee. In other examples, the conference call auto-connect application 20 may continuously run.

In one example, the headset 15 includes a don/doff detector 17 which detects whether the headset 15 is donned or doffed. Such detectors may include the use of motion or capacitance sensors. Further discussion regarding the use of sensors or detectors and determination circuits to detect a donned or doffed state can be found in the commonly assigned and co-pending U.S. patent application entitled "Donned and Doffed Headset State Detection" (U.S. Ser. No. 11/542,385), which was filed on Oct. 2, 2006, and which is hereby incorporated into this disclosure by reference for all purposes. If it is detected that the headset 15 is donned by the attendee, calls are automatically initiated at the meeting date and time without need for attendee confirmation using the reminder prompt.

Conference call auto-connect application 20 transfers the retrieved dial-in number to headset base station 14 and landline telephone 16, which initiates call 44. Upon connection with the dial-in location 54, conference call auto-connect application 20 retrieves the conference identification number and/or user identification number from memory at personal computer 10 and transmits them to dial-in location 54 to connect (i.e., gain admission or join) to the conference call. Conference call auto-connect application 20 may also retrieve and transmit a pre-stored voice signature to the dial-in location 54 to announce attendee 12.

Figure 9:
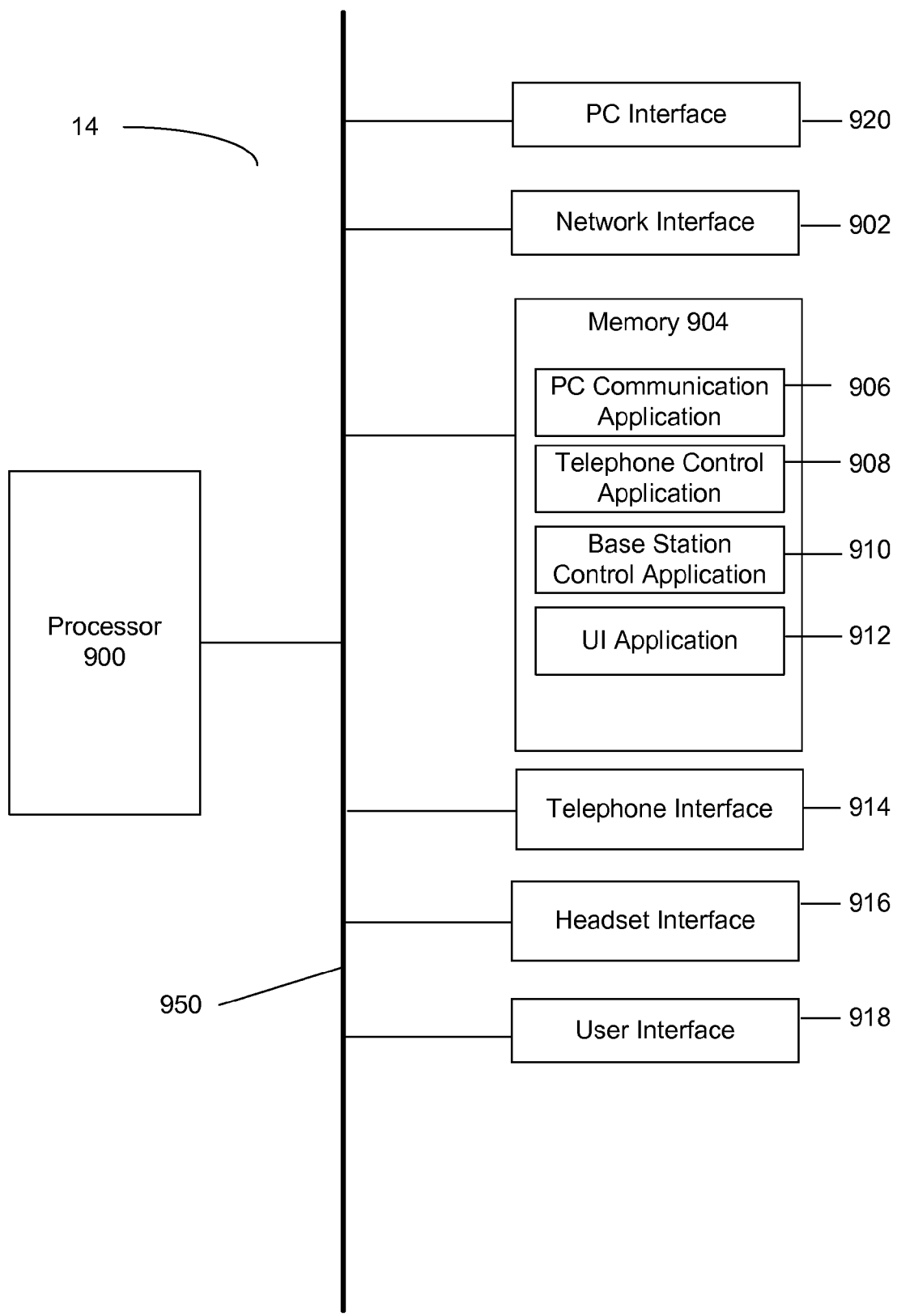
FIG. 9 illustrates a simplified block diagram of a headset base station in one example implementation.

FIG. 9 illustrates a simplified block diagram of a headset base station 14 in one example implementation. Headset base station 14 includes a processor 900 operably coupled via a bus 950 to a PC interface 920, network interface 902, memory 904, telephone interface 914, headset interface 916, and a user interface 918. In one example, headset interface 916 is a wireless communications transceiver and accompanying antenna for communication with a wireless headset. PC interface 920 may, for example, be a USB interface. Network interface 902 may, for example, be an Ethernet jack used to connect headset base station 14 to a server over the Internet or a local area network. Telephone interface 914 is used to connect headset base station 14 to landline telephone 16 as shown in FIG. 2. In one example, the headset base station 14 may be inserted between a landline telephone 16 handset and a landline telephone 16 body. In this example, the handset is coupled to the telephone interface 914, and a handset port on the landline telephone 16 body is also coupled to telephone interface 914. The landline telephone 16 body may be connected to the PSTN.

Processor 900 allows for processing data, in particular managing dial-in information between PC interface 920, telephone interface 914, and network interface 902. Processor 900 may include a variety of processors (e.g., digital signal processors), with conventional CPUs being applicable. Memory 904 may include a variety of memories, and in one example includes SDRM, ROM, flash memory, or a combination thereof. Memory 904 may further include separate memory structures or a single integrated memory structure. In one example, memory 904 may be used to store passwords, network and telecommunications programs, and/or an operating system (OS). Memory 904 stores a PC communication application 906 executed by processor 900 to receive dial-in information such as the dial-in number from a PC or other computing device over PC interface 920. Memory 904 also stores a telephone control application 908 executed by processor 900 to initiate calls using the dial-in number. Memory 904 also includes a base station control application 910 and a user interface application 912. User interface 912 allows for manual communication between the base station user and the headset base station 14, and in one example includes an audio and/or visual interface.

Referring again to FIG. 2, at attendee 26 conference call auto-connect application 30 retrieves the previously stored dial-in number from memory at smartphone 24 and initiates a call 46 to dial-in location 54 via communication networks 50. In one example, call 46 is a mobile phone call placed over a wireless communications network. Conference call auto-connect application 30 transfers the retrieved dial-in number to an outgoing call controller of smartphone 24, which initiates call 46. Upon connection with the dial-in location 54, conference call auto-connect application 30 retrieves the conference identification number and/or user identification number from memory at smartphone 24 and transmits them to dial-in location 54 to connect (i.e., gain admission or join) to the conference call. Conference call auto-connect application 30 may also retrieve and transmit a pre-stored voice signature to the dial-in location 54 to announce attendee 26.

Similarly, at attendee 36 conference call auto-connect application 40 retrieves the previously stored dial-in number from memory at personal computer 34 and initiates a call 48 to dial-in location 54 via communication networks 50. In one example, call 48 is a VoIP phone call placed over an IP communications network such as the Internet. Conference call auto-connect application 40 transfers the retrieved dial-in number to a VoIP softphone application 42 operating on personal computer 34, which initiates call 48. Upon connection with the dial-in location 54, conference call auto-connect application 40 retrieves the conference identification number and/or user identification number from memory at personal computer 34 and transmits them to dial-in location 54 using VoIP softphone application 42 to connect (i.e., gain admission or join) to the conference call. Conference call auto-connect application 40 may also retrieve and transmit a pre-stored voice signature to the dial-in location 54 to announce attendee 36.

Communication networks 50 may be any combination of communication networks capable of carrying voice data, including a PSTN, a wireless telecommunication provider network, the Internet, a Local Area Network (LAN), Wide Area Network (WAN), or Internet Protocol (IP) network implementing VoIP. Dial-in location 54 may, for example, be a telephone conference bridge or other service center.

Figure 6:
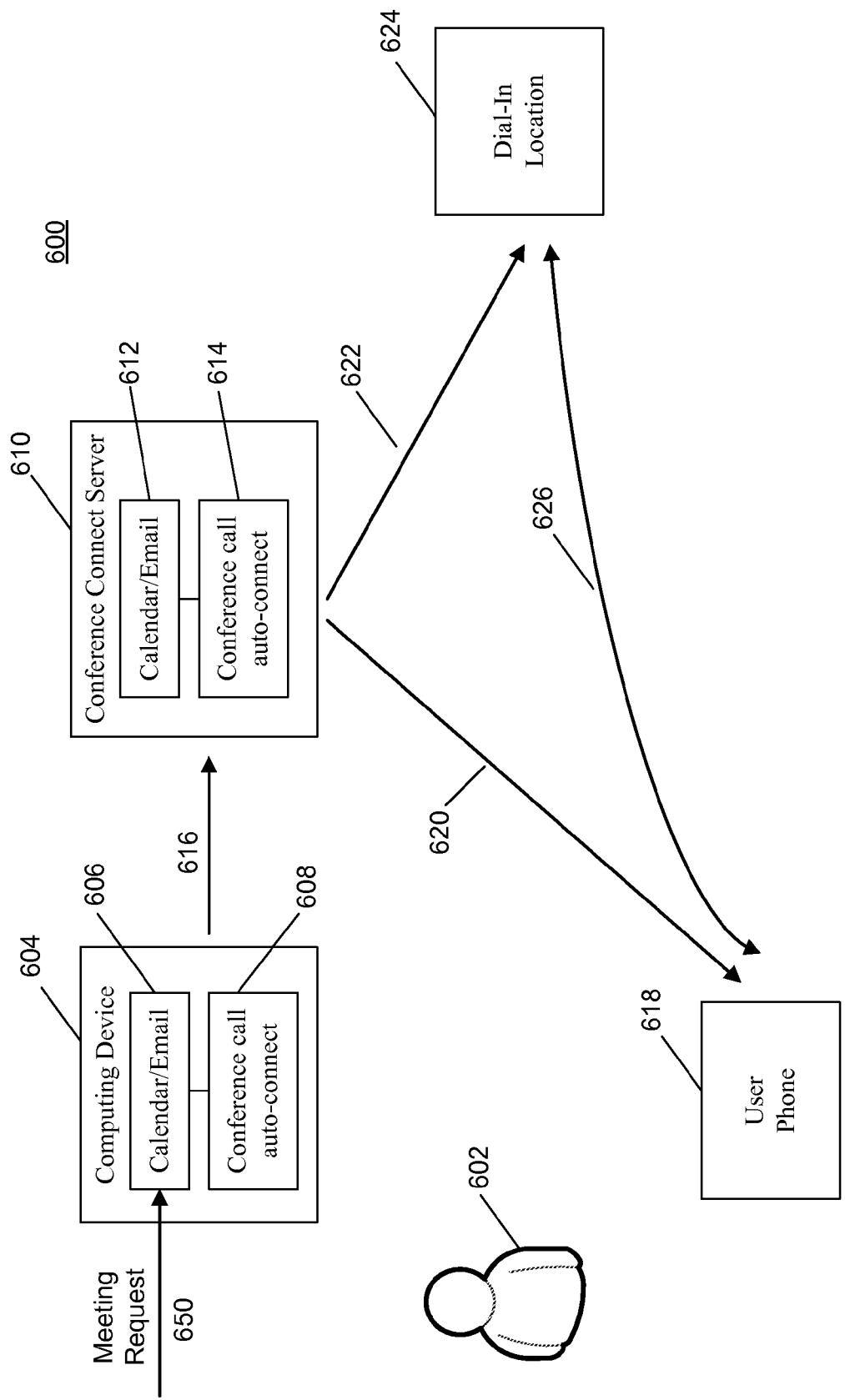
FIG. 6 illustrates a system for audio-dialing into a dial-in location in a further example.
Figure 7A:
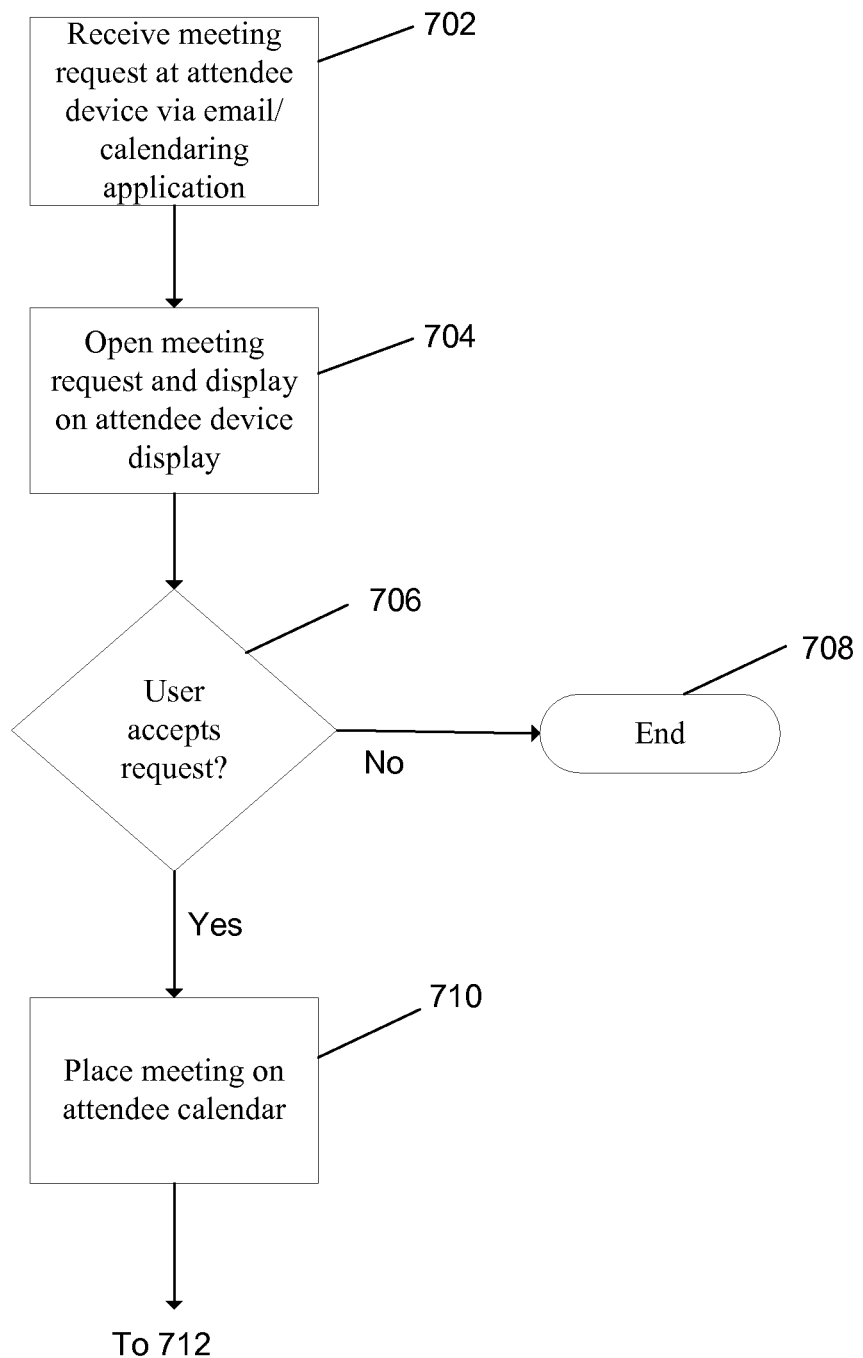
FIGS. 7A-7D are a flow diagram illustrating auto-dialing and connection into conference calls in one example of the invention.
Figure 7B:
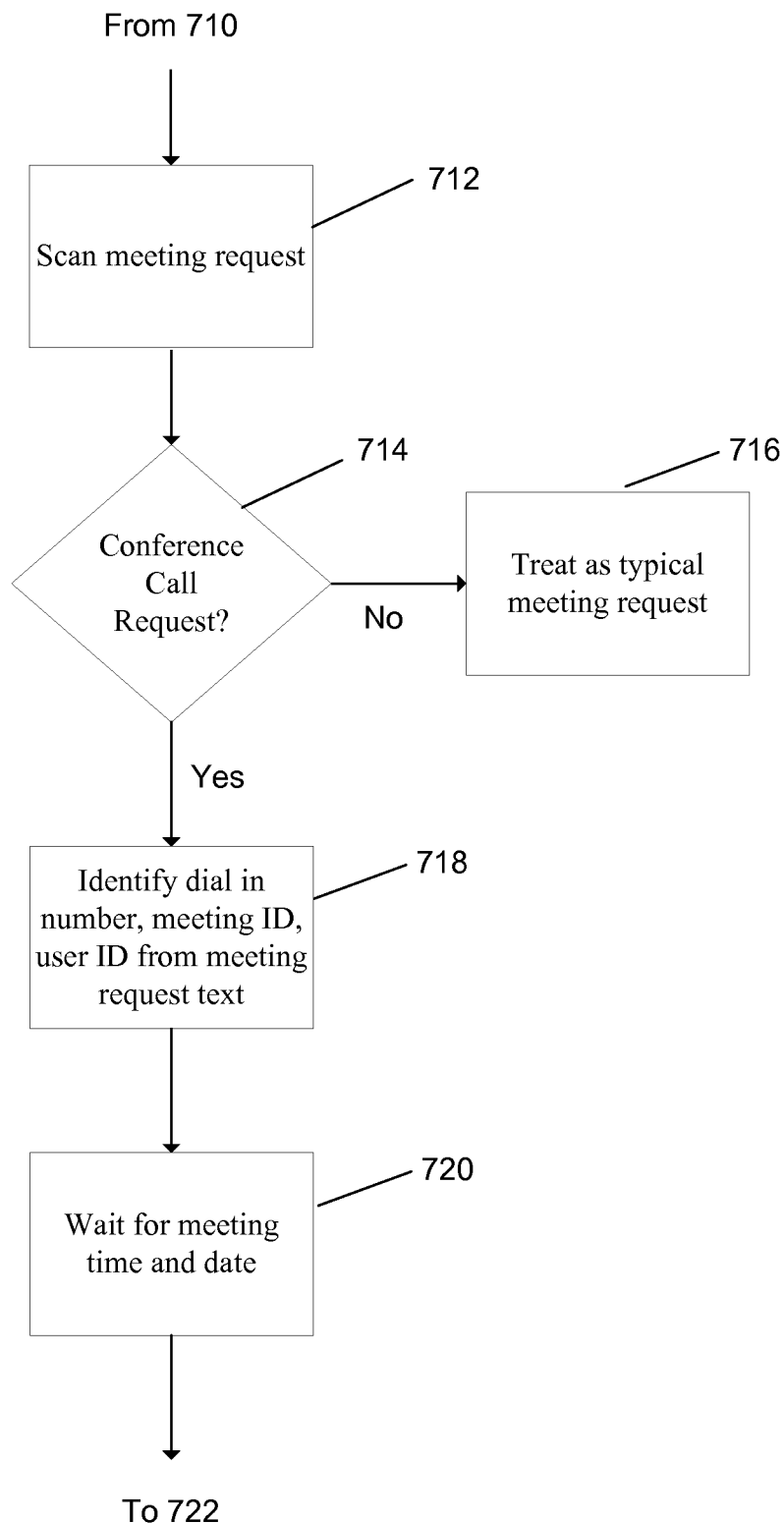
Figure 7C:
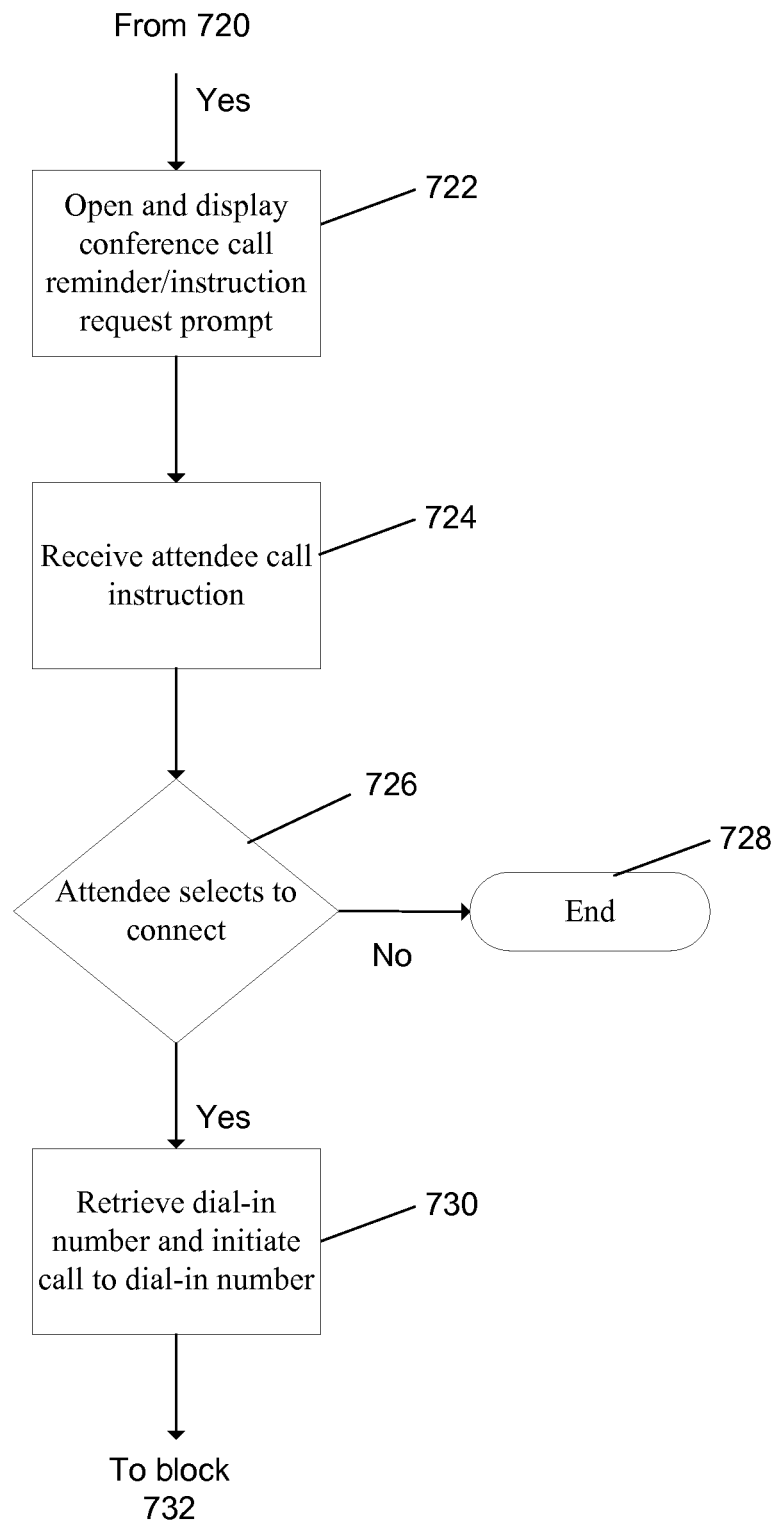
Figure 7D:
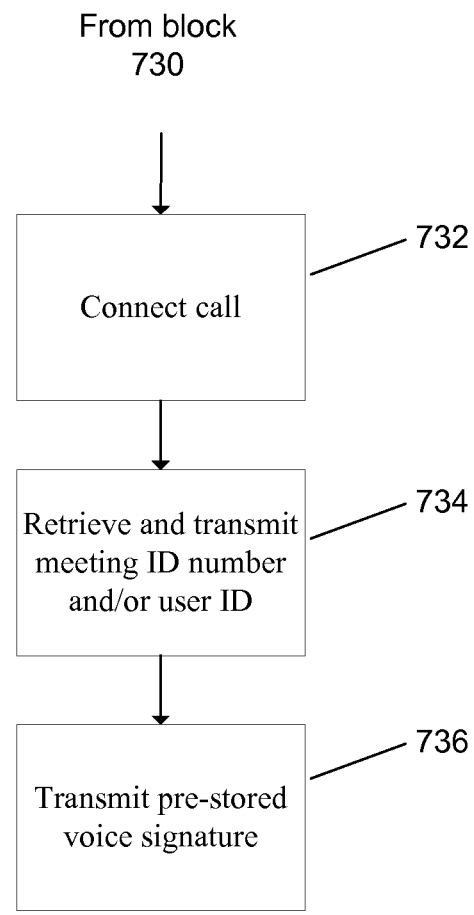
Figure 8A:
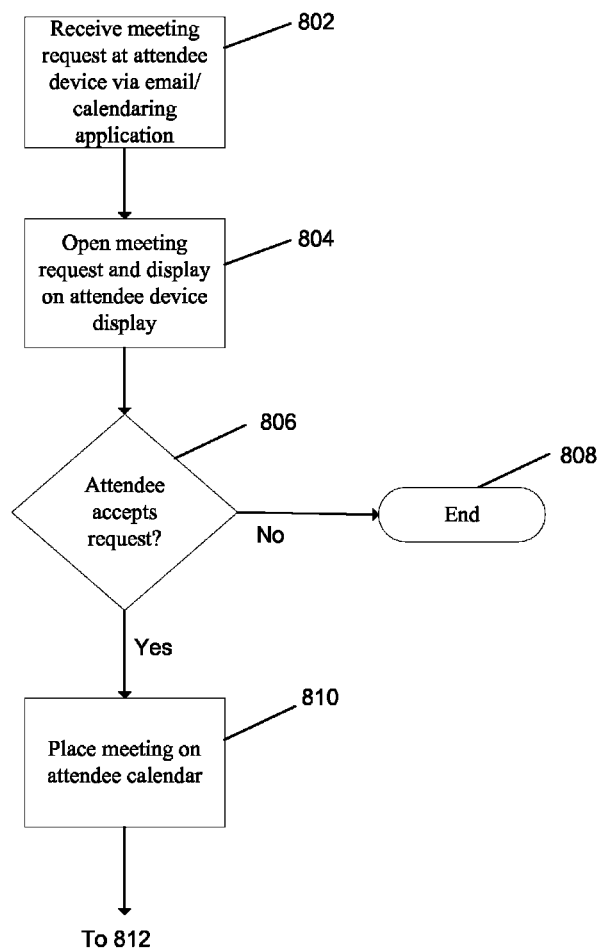
FIGS. 8A-8E are a flow diagram illustrating auto-dialing and connection into conference calls in a further example of the invention.
Figure 8B:
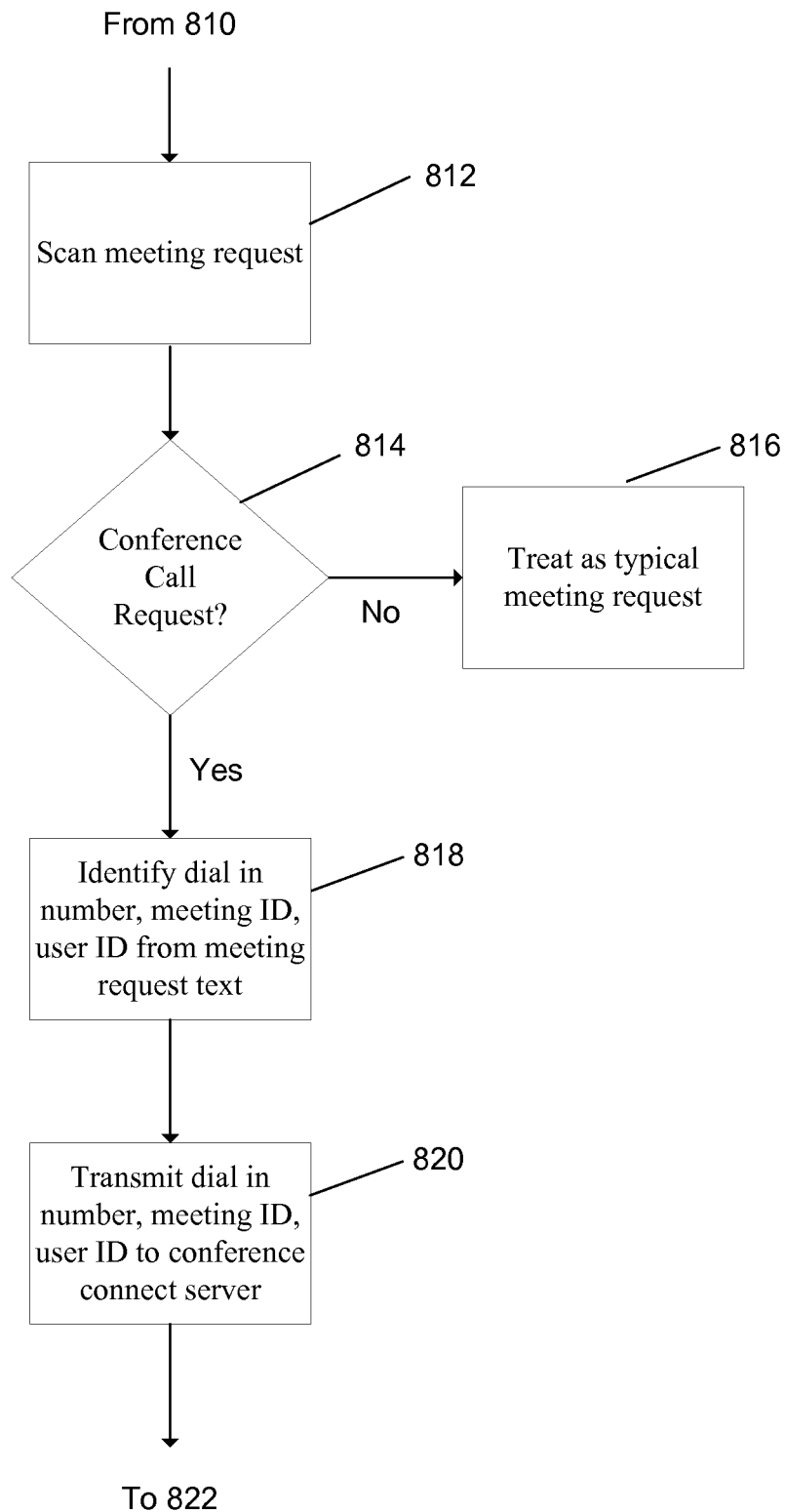
Figure 8C:
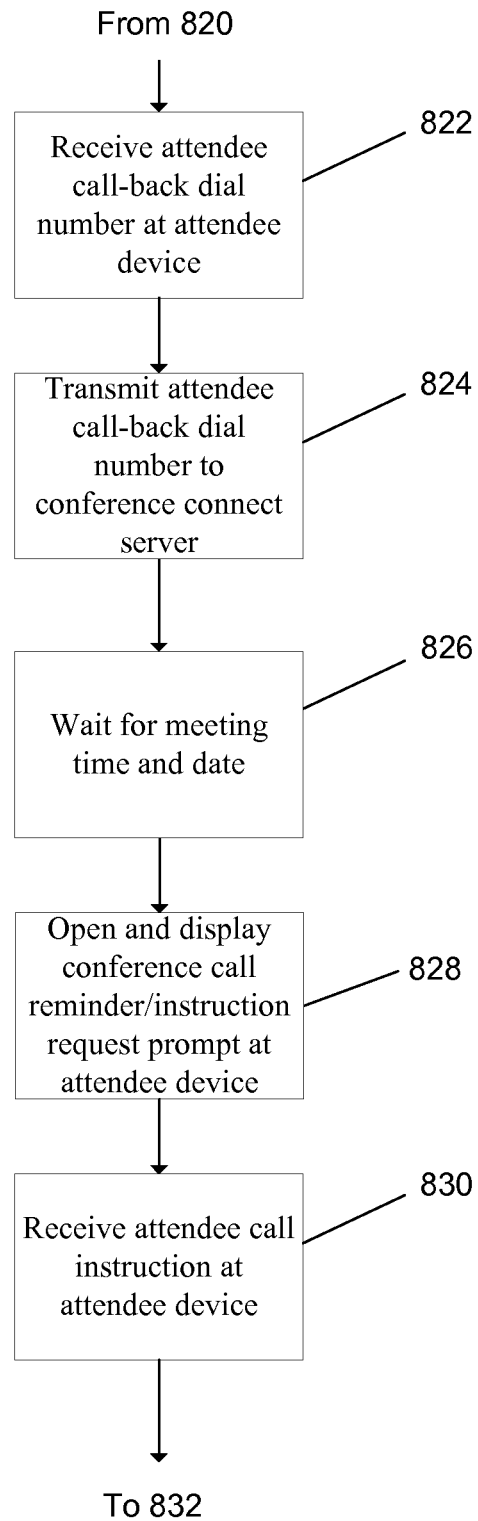
Figure 8D:
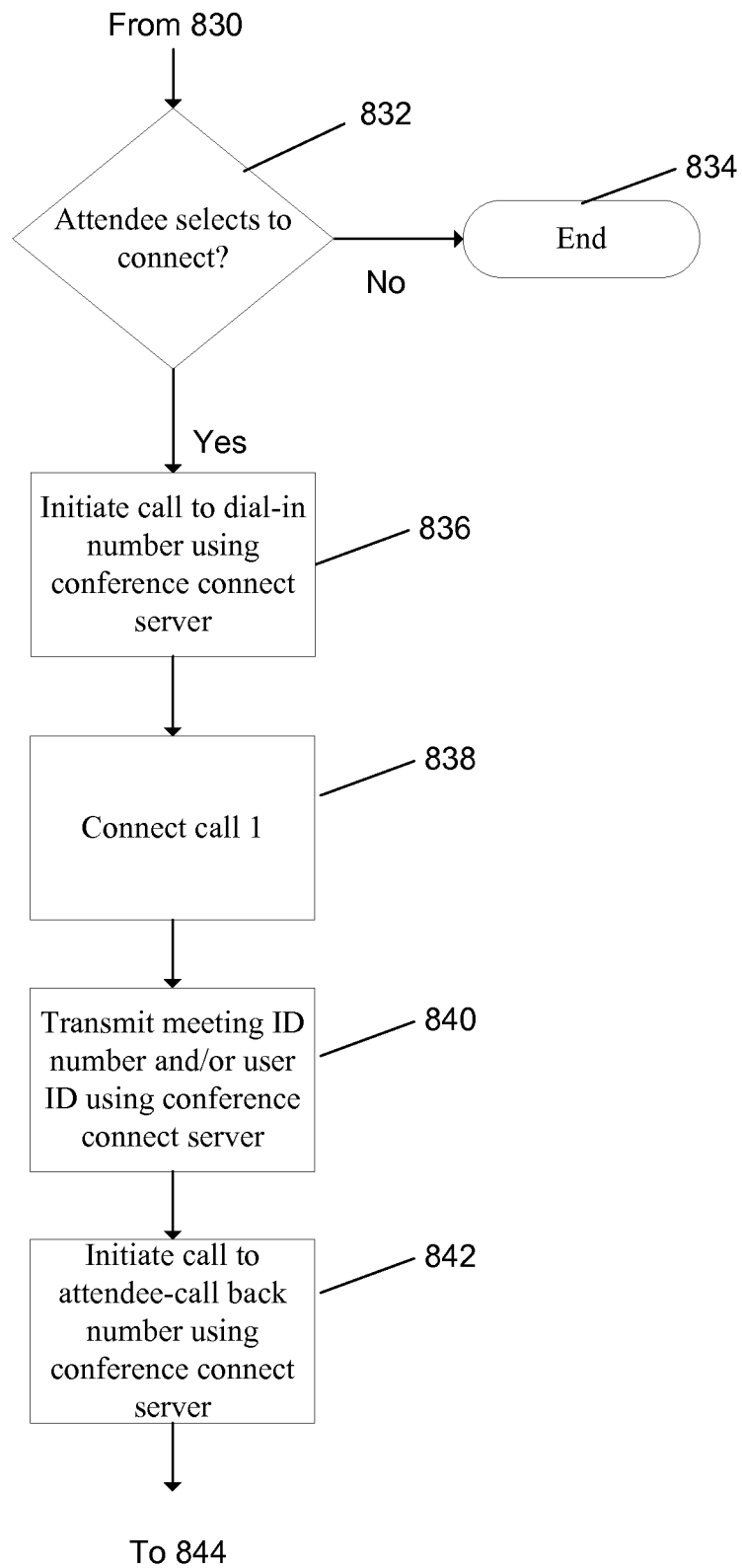
Figure 8E:
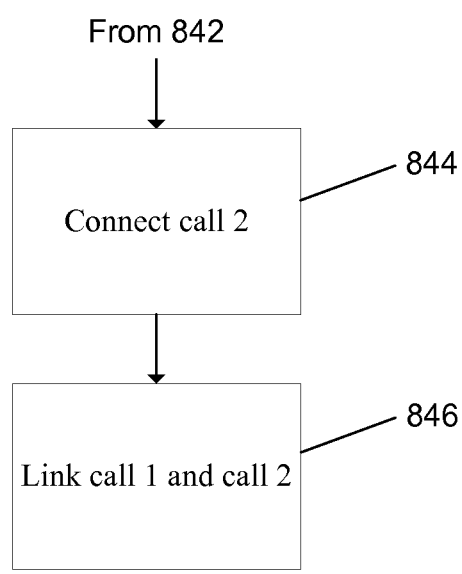

FIG. 6 illustrates a system 600 for auto-dialing into a dial-in location in a further example. System 600 includes a computing device 604 executing a calendar/email application 606. The system 600 also includes a conference call connect server 610 executing a calendar/email application 612 and conference call auto-connect application 614. In one example, computing device 604 includes a conference call auto-connect application 608 performing functions described herein. In a further example, computing device 604 does not have conference call auto-connect application 608, and meeting requests received at computing device 604 are forwarded to conference call connect server 610 for processing. In FIG. 6, an attendee 602 receives a meeting request 650 sent by a meeting organizer. Upon acceptance of the meeting request 650 by attendee 602, conference call auto-connect application 608 processes the meeting request to identify whether it is a telephone conference call meeting. If yes, then calendar/email application 606 automatically forwards the meeting request to calendar/email application 612 at the conference call connect server 610 using a communication link 616. At this time, the conference call auto-connect application 608 may also prompt the attendee 602 to enter a call-back number corresponding to a telephone the attendee 602 would like to use for the telephone conference call. Since most individuals have several telephony devices available to them to make and receive calls, requesting the attendee enter a call back number allows the attendee to select the desired telephony device with which to participate in the conference call. For example, if the attendee has knowledge that he will be out of the office at the time of the call, he may choose to enter his mobile phone number or home landline telephone number.

The call-back number is sent to conference call connect server 610 for storage in memory. The calendar/email application 612 places a calendar event corresponding to the accepted meeting request on the calendar at the meeting date and time. The conference call auto-connect application 614 scans the text fields of the meeting request to identify the dial-in number, conference identification number, and/or user identification number and stores them in memory at the conference call connect server 610. Alternatively, the conference call auto-connect application 608 at the computing device 604 scans the text fields of the meeting request to identify the dial-in number, conference identification number, and/or user identification number, and sends this data to conference call connect server 610 via communication link 616 for storage in memory at the conference call connect server 610.

At the designated meeting date and time, the conference call auto-connect application 614 automatically calls the dial-in-number. The attendee 602 may receive a conference call reminder/instruction request prompt as discussed previously to confirm whether the attendee wishes to connect to or cancel the telephone conference call. In this instance, the attendee 602 must confirm his desire to connect as a pre-requisite for the conference call auto-connect application 614 to call the dial-in number. At this time, the attendee 602 may be prompted to enter a call-back number to be used for the telephone conference call if not provided previously by the attendee 602, which is then sent to conference call connect server 610.

The conference call auto-connect application 614 retrieves the previously stored dial-in number from memory at conference call connect server 610 and initiates a call 622 to dial-in location 624. Upon connection with the dial-in location 624, conference call auto-connect application 614 retrieves the conference identification number and/or user identification number from memory at conference call connect server 610 and transmits them to dial-in location 624 to connect (i.e., gain admission or join) to the conference call. Upon connection with the dial-in location 624, the conference call auto-connect application 614 retrieves the previously stored attendee call-back number from memory at conference call connect server 610 and initiates a call 620 to an attendee phone 618. Attendee phone 618 may, for example, be the attendee's mobile phone, landline phone, or VoIP phone depending upon the call-back number provided by the attendee. In this manner, the attendee 602 may participate in the conference call regardless of his location. Advantageously, the attendee phone 618 need not run any additional conference call software for the auto-connect process to occur.

Upon connection with attendee phone 618, the conference call connect server 610 links call 620 with call 622 to form a direct link 626 between attendee phone 618 and dial-in location 624. Upon formation of direct link 626, conference call auto-connect application 614 may retrieve and transmit a pre-stored voice signature to the dial-in location 624 to announce attendee 602.

FIGS. 7A-7D are a flow diagram illustrating auto-dialing and connection into conference calls in one example of the invention. At block 702, an attendee receives a meeting request at an attendee device via an email/calendaring application executed on the attendee device. For example, the attendee computing device is a personal computer, smartphone, or any other computing device capable of connection to a communications network.

In one example, the meeting request is received via email. At block 704, upon opening by the attendee, the meeting request is opened and the meeting request is displayed on the attendee computing device. The meeting request includes a proposed date and time, and a prompt for the attendee to accept or reject the meeting request. At decision block 706, an accept meeting instruction or a reject meeting instruction is then received from the attendee. If the attendee does not accept the meeting request (i.e., responds with a reject meeting instruction), at block 708 the conference call connect process ends.

If the attendee accepts the meeting request (i.e., responds with an accept meeting instruction), at block 710 the meeting request is placed on the attendee calendar at the proposed date and time as a calendar item. At block 712, the meeting request text is scanned. At decision block 714, it is determined whether the meeting request is a request for a telephone conference call. For example, if a conference call dial-in number is identified at block 712, the meeting request is classified as a telephone conference call. If no at decision block 714, at block 716 the meeting request is classified and treated as an in-person meeting and the conference call connect process ends.

If yes at decision block 714, the conference call dial-in number, conference call meeting identification number, and user identification number are identified from the meeting request at block 718. Depending upon the nature of the conference call and the specific attendee receiving the meeting request, a user identification number may or may not be included in the meeting request. In one example, the identified items are stored in a memory at the computing device.

At block 720, the calendar/email application waits for the calendar item scheduled date and time. At block 722, a meeting reminder is opened and displayed on the attendee computing device at the proposed date and time or a predetermined period prior to the proposed date and time. The meeting reminder serves to both remind the attendee of the upcoming telephone conference call and prompt the attendee to enter a call instruction confirming or cancelling his desire to participate in the telephone conference call. At block 724, a telephone conference call confirmation instruction or cancellation instruction is received from the attendee. At decision block 726, it is determined whether the attendee has selected to connect to the telephone conference call. If no at decision block 726, at block 728 the conference call connect process terminates.

If yes at decision block 726, at block 730, the dial-in number is retrieved from memory at the scheduled date and time and automatically called. Depending upon the attendee computing device, automatically calling the dial-in number may involve initiating a call over an Internet Protocol network, a mobile cellular network, or a public switched telephone network (PSTN). At block 732, a network connection is established with a remote device corresponding to the dial-in location to connect the call. At block 734, the conference call meeting identification number is transmitted over the network connection to the remote device. If available, the user identification number is also automatically transmitted over the network connection. In one example, at block 736, a pre-stored voice signature for the attendee is transmitted over the network connection to the remote device to announce the presence of the attendee to the other conference call participants.

FIGS. 8A-8E are a flow diagram illustrating auto-dialing and connection into conference calls in a further example of the invention. For example, the process illustrated may be implemented by system 600 shown in FIG. 6. At block 802, an attendee receives a meeting request at an attendee device via an email/calendaring application executed on the attendee device. For example, the attendee computing device is a personal computer, smartphone, or any other computing device capable of connection to a communications network. In one example, the meeting request is received via email. In further examples, the meeting request may be in the form of other types of electronic messages, such as SMS messages. At block 804, upon opening by the attendee, the meeting request is opened and the meeting request is displayed on the attendee computing device. The meeting request includes a proposed date and time, and a prompt for the attendee to accept or reject the meeting request. At decision block 806, an accept meeting instruction or a reject meeting instruction is then received from the attendee. If the attendee does not accept the meeting request (i.e., responds with a reject meeting instruction), at block 808 the conference call connect process ends.

If the attendee accepts the meeting request (i.e., responds with an accept meeting instruction), at block 810 the meeting request is placed on the attendee calendar at the proposed date and time as a calendar item. At block 812, the meeting request text is scanned. At decision block 814, it is determined whether the meeting request is a request for a telephone conference call. For example, if a conference call dial-in number is identified at block 812, the meeting request is classified as a telephone conference call. If no at decision block 814, at block 816 the meeting request is classified and treated as an in-person meeting and the conference call connect process ends.

If yes at decision block 814, the conference call dial-in number, conference call meeting identification number, and user identification number are identified from the meeting request at block 818. Depending upon the nature of the conference call and the specific attendee receiving the meeting request, a user identification number may or may not be included in the meeting request.

At block 820, the conference call dial-in number and the conference call meeting identification number are transmitted to a remote conference call connect server for storage. If located, the user identification number is also transmitted. At block 822, an attendee call-back number input at the attendee computing device by the attendee is received. Alternatively, the attendee call-back number is received at block 830 below when the attendee call instruction is received. At block 824, the attendee call-back number is transmitted to the remote conference call connect server for storage in the memory of the conference call connect server.

In one example, the meeting request received at the attendee computing device is forwarded to the conference call connect server and placed on a calendaring application at the conference call connect server at the proposed date and time. Alternatively, only the telephone conference date and time data is sent to the conference call connect server.

At block 826, the calendar/email application waits for the calendar item scheduled date and time. At block 828, a meeting reminder is opened and displayed on the attendee computing device at the proposed date and time or a predetermined period prior to the proposed date and time. The meeting reminder serves to both remind the attendee of the upcoming telephone conference call and prompt the attendee to enter a call instruction confirming or cancelling his desire to participate in the telephone conference call. At block 830, a telephone conference call confirmation instruction or cancellation instruction is received from the attendee. This instruction is sent to the remote conference call connect server. At decision block 832, it is determined whether the attendee has selected to connect to the telephone conference call. If no at decision block 832, at block 834 the conference call connect process terminates.

If yes at decision block 832, at block 836, the dial-in number is retrieved from memory at the scheduled date and time and automatically called by the conference call connect server. At block 838, a network connection is established with a remote device corresponding to the dial-in location to connect the first call. At block 840, the conference call meeting identification number is transmitted over the network connection to the remote dial-in location by the conference call connect server. If available, the user identification number is also automatically transmitted over the network connection.

At block 842, the attendee call back number is retrieved from memory at the scheduled date and time and automatically called by the conference call connect server. At block 844, a network connection is established with the attendee device corresponding to the call-back location to connect the second call made by the conference call connect server. Advantageously, the attendee device may be a mobile phone, landline phone, or VoIP phone. At block 846, the conference call connect server links the first call and the second call so that the attendee device is linked to the dial-in location, enabling the attendee to participate in the conference call. In a further example, the attendee call back number is called first, and the dial-in number called second by the conference call connect server.

In one example, a pre-stored voice signature for the attendee is transmitted by the conference call connect server over the first network connection to the remote device to announce the presence of the attendee to the other conference call participants. This may occur prior to or immediately following linking the first call and the second call.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the type of computing devices used by meeting attendees; the type of communication network used by the telephones; standards to perform the VoIP call setup, signaling, and control; user interface input mechanisms to control conference or hookswitch operation at the headset. For example, the communications network used may be a PSTN, a public or private data network, wireline or wireless network, or the Internet. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

Those skilled in the art will appreciate that the reference to the terms "VoIP" and "VoIP telephone" are used in the generic sense to include any "voice-over-packet" technique or device, without limitation to a specific standard.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for dialing into a conference call comprising:
   receiving at an attendee computing device a meeting request notification message comprising a meeting request, wherein the meeting request includes a proposed date and time, a conference call dial-in number, and a conference call meeting identification number;
   receiving an accept meeting instruction or a reject meeting instruction;
   placing the meeting request on a calendaring application at the attendee computing device at the proposed date and time;
   displaying a meeting reminder on the attendee computing device at the proposed date and time or a predetermined period prior to the proposed date and time;
   receiving a conference call confirmation instruction or cancellation instruction;
   automatically calling the conference call dial-in number at the proposed date and time responsive to receiving the conference call confirmation instruction;
   establishing a network connection with a remote device; and
   transmitting the conference call meeting identification number over the network connection.

2. The method of claim 1, wherein scanning a contents of a meeting request notification message further comprises identifying a user identification number.

3. The method of claim 2, further comprising automatically transmitting the user identification number over the network connection.

4. The method of claim 1, further comprising transmitting a pre-stored voice signature over the network connection.

5. The method of claim 1, wherein the attendee computing device is a personal computer or a smartphone.

6. The method of claim 1, wherein automatically calling the conference call dial-in number comprises automatically initiating a call over an Internet Protocol network, a mobile cellular network, or a public switched telephone network (PSTN).

7. The method of claim 1, wherein the meeting request notification message is an email or SMS message.

8. A system for dialing into a conference call comprising:
   a landline telephone connected to a public switched telephone network a headset base coupled to the landline telephone; and
   a computing device coupled to the headset base and a communications network, the computing device comprising:
   a meeting request notification message means for receiving a meeting request notification message comprising a meeting request over the communications network, wherein the meeting request includes a proposed date and time, a conference call dial-in number, and a conference call meeting identification number;
   a calendaring means for placing the meeting request on a calendaring application at the computing device at the proposed date and time; and
   a dialing means for automatically calling the conference call dial-in number at the proposed date and time though the public switched telephone network, and automatically transmitting the conference call meeting identification number over an established public switched telephone network connection.

9. The system of claim 8, wherein the dialing means calls the conference call dial-in number through the headset base and the landline telephone.

10. The system of claim 8, wherein the communications network comprises the Internet.

11. The system of claim 8, further comprising a headset having a don/doff detector, wherein the dialing means automatically calls the conference call dial-in number at the proposed date and time only if it is detected that the headset is donned.

12. A non-transitory computer readable storage medium storing instructions that when executed by a computer cause the computer to perform a method for dialing into a conference call comprising:
    receiving at an attendee computing device a meeting request notification message comprising a meeting request, wherein the meeting request includes a proposed date and time, a conference call dial-in number, and a conference call meeting identification number;
    receiving an accept meeting instruction or a reject meeting instruction;
    placing the meeting request on a calendaring application at the attendee computing device at the proposed date and time;
    displaying a meeting reminder on the attendee computing device at the proposed date and time or a predetermined period prior to the proposed date and time;
    receiving a conference call confirmation instruction or cancellation instruction;
    automatically calling the conference call dial-in number at the proposed date and time responsive to receiving the conference call confirmation instruction;
    establishing a network connection with a remote device; and
    transmitting the conference call meeting identification number over the network connection.

13. The non-transitory computer readable storage medium of claim 12, wherein scanning a contents of a meeting request notification message further comprises identifying a user identification number.

14. The non-transitory computer readable storage medium of claim 13, the method further comprising automatically transmitting the user identification number over the network connection.

15. The non-transitory computer readable storage medium of claim 12, the method further comprising transmitting a pre-stored voice signature over the network connection.

16. The non-transitory computer readable storage medium of claim 12, wherein the attendee computing device is a personal computer or a smartphone.

17. The non-transitory computer readable storage medium of claim 12, wherein automatically calling the conference call dial-in number comprises automatically initiating a call over an Internet Protocol network, a mobile cellular network, or a public switched telephone network.

18. The non-transitory computer readable storage medium of claim 12, wherein the meeting request notification message is an email or SMS message.

19. A method for dialing into a conference call comprising:
receiving at an attendee computing device a meeting request notification message comprising a meeting request, wherein the meeting request includes a proposed date and time, a conference call dial-in number, and a conference call meeting identification number;
receiving an accept meeting instruction or a reject meeting instruction;
transmitting the conference call dial-in number and the conference call meeting identification number to a first remote device for storage in a memory of the first remote device;
receiving an attendee call-back number input at the attendee computing device;
transmitting the attendee call-back number to the first remote device for storage in the memory of the first remote device;
placing the meeting request on a calendaring application at the attendee computing device at the proposed date and time;
displaying a meeting reminder on the attendee computing device at the proposed date and time or a predetermined period prior to the proposed date and time;
receiving a conference call confirmation instruction or cancellation instruction;
automatically calling the conference call dial-in number using the first remote device at the proposed date and time responsive to receiving the conference call confirmation instruction;
establishing a first network connection between the first remote device and a second remote device;
transmitting the conference call meeting identification number from the first remote device to the second remote device over the first network connection;
automatically calling the attendee call-back number using the first remote device;
establishing a second network connection between the first remote device and an attendee telephone; and
linking the attendee telephone to the second remote device to join a conference call.

20. The method of claim 19, wherein scanning a contents of a meeting request notification message further comprises identifying a user identification number.

21. The method of claim 20, further comprising automatically transmitting the user identification number from the first remote device to the second remote device over the first network connection.

22. The method of claim 19, further comprising automatically transmitting a pre-stored voice signature from the first remote device to the second remote device over the first network connection.

23. The method of claim 19, wherein the attendee telephone is a mobile phone or a landline telephone.

24. The method of claim 19, wherein the meeting request notification message is an email or SMS message.

25. The method of claim 1, further comprising transmitting an identification number indicating a user is a call leader after automatically calling the conference call dialing number at the proposed date and time and establishing the network connection with the remote device, wherein the identification number is located in the meeting request notification message.

26. The method of claim 1, further comprising displaying the meeting reminder on a second attendee computing device comprising a second calendaring application synchronized with the calendaring application on the attendee computing device, wherein the conference call confirmation instruction or cancellation instruction is received at the second attendee computing device, and wherein automatically calling the conference call dial-in number is performed by the second attendee computing device.

27. The method of claim 8, wherein the dialing means is further configured to transmit an identification number indicating a user is a call leader after automatically calling the conference call dialing number at the proposed date and time, wherein the identification number is located in the meeting request notification message.

28. The non-transitory computer readable storage medium of claim 12, wherein the method performed further comprises transmitting an identification number indicating a user is a call leader after automatically calling the conference call dialing number at the proposed date and time and establishing the network connection with the remote device, wherein the identification number is located in the meeting request notification message.

29. The method of claim 19, further comprising transmitting an identification number indicating a user is a call leader from the first remote device to the second remote device over the first network connection.

30. A headset base for dialing into a conference call comprising:
a computing device interface;
a headset interface configured to communicate with a headset;
a telephone network interface;
a processor; and
a memory storing a telephone call control application configured to receive a call initiation instruction over the computing device interface to automatically call a conference call dial-in number at a calendared date and time, wherein the telephone call control application is further configured to dial the conference call dial-in number over the telephone network interface.

31. The headset base of claim 30, wherein the telephone call control application is further configured to transmit a conference call meeting identification number received over the computing device interface.

32. The headset base of claim 30, wherein the telephone call control application is further configured to transmit an identification number indicating a user is a call leader, the identification number received over the computing device interface.

33. The headset base of claim 30, wherein the computing device interface is a Universal Serial Bus interface to a personal computer.

34. A method for dialing into a conference call comprising:
receiving at an attendee computing device a meeting request notification message comprising a proposed date and time, a conference call dial-in number, and a conference call meeting identification number;
receiving an accept meeting instruction;
receiving information associated with a donned status or a doffed status of a headset;
responsive to determination of a donned status of the headset, automatically calling the conference call dial-in number at the proposed date and time; and transmitting the conference call meeting identification number.

35. The method of claim 34, further comprising transmitting an identification number indicating a user is a call leader after automatically calling the conference call dialing number at the proposed date and time.

36. The method of claim 1, wherein receiving a conference call confirmation instruction or cancellation instruction comprises receiving the conference call confirmation instruction or cancellation instruction prior to the proposed date and time.

37. The method of claim 19, wherein receiving a conference call confirmation instruction or cancellation instruction comprises receiving the conference call confirmation instruction or cancellation instruction prior to the proposed date and time.

* * * * *